US011295700B2

(12) United States Patent
Guo et al.

(10) Patent No.: US 11,295,700 B2
(45) Date of Patent: Apr. 5, 2022

(54) DISPLAY APPARATUS, DISPLAY METHOD, IMAGE PROCESSING DEVICE AND COMPUTER PROGRAM PRODUCT FOR IMAGE PROCESSING

(71) Applicant: BOE TECHNOLOGY GROUP CO., LTD., Beijing (CN)

(72) Inventors: Zhenpeng Guo, Beijing (CN); Haipeng Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 488 days.

(21) Appl. No.: 16/328,910

(22) PCT Filed: May 25, 2018

(86) PCT No.: PCT/CN2018/088369
§ 371 (c)(1),
(2) Date: Feb. 27, 2019

(87) PCT Pub. No.: WO2018/223850
PCT Pub. Date: Dec. 13, 2018

(65) Prior Publication Data
US 2021/0280150 A1  Sep. 9, 2021

(30) Foreign Application Priority Data

Jun. 5, 2017 (CN) .......................... 201710415328.3

(51) Int. Cl.
G09G 5/02 (2006.01)
G06T 7/90 (2017.01)
(Continued)

(52) U.S. Cl.
CPC ................. G09G 5/02 (2013.01); G06T 7/90 (2017.01); G09G 2300/0443 (2013.01); G09G 2320/0666 (2013.01)

(58) Field of Classification Search
CPC combination set(s) only.
See application file for complete search history.

(56) References Cited

U.S. PATENT DOCUMENTS 6,346,933 B1 * 2/2002 Lin .................... G06K 9/00335
345/157
2014/0306890 A1 10/2014 Ozawa
(Continued)

FOREIGN PATENT DOCUMENTS

| CN | 1289086 A | 3/2001 |
| CN | 101419513 A | 4/2009 |

(Continued)

OTHER PUBLICATIONS

International Search Report of PCT/CN2018/088369 in Chinese, dated Aug. 29, 2018, with English translation.
(Continued)

Primary Examiner — Wesner Sajous
(74) Attorney, Agent, or Firm — Collard & Roe, P.C.

(57) ABSTRACT

Provided are a display apparatus, a display method, an image processing apparatus, and a computer program product for image processing. The display apparatus includes: a first display portion, an indication signal receiver an enhanced region determination portion and an image processing portion. The first display portion is configured to display a first image. The indication signal receiver is configured to acquire a position of an indication point in a region of the first image, and to send a position signal according to the position of the indication point. The enhanced region determination portion is configured to determine an enhanced region according to the position signal. The image processing portion is configured to carry out enhanced display processing on the enhanced region based on a signal of the first image so as to form a signal of
(Continued)

a second image, and to output the signal of the second image.

18 Claims, 12 Drawing Sheets

(51) Int. Cl.
*H04N 5/44* (2011.01)
*H04N 5/50* (2006.01)
*H04N 9/69* (2006.01)
*H04N 9/74* (2006.01)

(56) References Cited

U.S. PATENT DOCUMENTS

| | | | | |
|---|---|---|---|---|
| 2014/0317554 | A1* | 10/2014 | Song | G06F 3/017 715/781 |
| 2015/0022542 | A1* | 1/2015 | Baba | G02B 27/017 345/589 |
| 2015/0205345 | A1* | 7/2015 | Naess | G06F 3/0304 345/156 |
| 2015/0293654 | A1* | 10/2015 | Cho | G06F 3/048 715/768 |
| 2017/0003769 | A1 | 1/2017 | Shimazaki et al. | |
| 2018/0139405 | A1* | 5/2018 | Baek | H04N 21/4728 |

FOREIGN PATENT DOCUMENTS

| | | |
|---|---|---|
| CN | 101533316 A | 9/2009 |
| CN | 102253765 A | 11/2011 |
| CN | 102455575 A | 5/2012 |
| CN | 103376894 A | 10/2013 |
| CN | 107239248 A | 10/2017 |

OTHER PUBLICATIONS

Notice of Transmittal of the International Search Report of PCT/CN2018/088369 in Chinese, dated Aug. 29, 2018.
Written Opinion of the International Searching Authority of PCT/CN2018/088369 in Chinese, dated Aug. 29, 2018 with English translation.
Chinese Office Action in Chinese Application No. 201710415328.3, dated Mar. 28, 2019 with English translation.

* cited by examiner

S201 receiving a position signal of an indication point in a region where a first image is located

S202 determining an enhanced region according to the position signal

S203 performing a display enhanced processing on the enhanced region according to a signal of the first image to form a signal of a second image, and outputting the signal of the second image

DISPLAY APPARATUS, DISPLAY METHOD, IMAGE PROCESSING DEVICE AND COMPUTER PROGRAM PRODUCT FOR IMAGE PROCESSING

CROSS-REFERENCE TO RELATED APPLICATION

This application is the National Stage of PCT/CN2018/088369 filed on May 25, 2018, which claims priority under 35 U.S.C. § 119 of Chinese Application No. 201710415328.3 filed on Jun. 5, 2017, the disclosure of which is incorporated by reference.

TECHNICAL FIELD

The embodiments of the present disclosure relate to a display apparatus, a display method, an image processing device and a computer program product for image processing.

BACKGROUND

In a large-scale public speech, a projection curtain for the speech is large because the number of audiences is large, and a large venue is needed; therefore, using a laser pointer as an indicator has poor effect, so the laser pointers are generally not used as an indicator in a large-scale speech. However, the indicator is also needed in some cases.

SUMMARY

At least one embodiment of the present disclosure relates to a display apparatus, a display method, an image processing device and a computer program product for image processing.

At least one embodiment of the present disclosure provides a display apparatus, which includes: a first display portion, an indication signal receiver, an enhanced region determining portion, and an image processing portion. The first display portion is configured to display a first image. The indication signal receiver is configured to acquire a position of an indication point in a region where the first image is located and send a position signal according to the position of the indication point. The enhanced region determining portion is configured to determine an enhanced region according to the position signal. The image processing portion is configured to perform a display enhanced processing on the enhanced region according to a signal of the first image to form a signal of a second image and configured to output the signal of the second image.

According to the display apparatus provided by one or more embodiments of the present disclosure, a region of the first image other than the enhanced region is not enhanced in display.

According to the display apparatus provided by one or more embodiments of the present disclosure, the display enhanced processing includes an adjustment in color of the enhanced region.

According to the display apparatus provided by one or more embodiments of the present disclosure, the adjustment in color of the enhanced region includes an adjustment in color of a background of the enhanced region.

According to the display apparatus provided by one or more embodiments of the present disclosure, the adjustment in color of the background of the enhanced region includes adjusting a color of the background in the enhanced region into a complementary color of a main color tone in the enhanced region, or into a color between a main display color in the enhanced region and a complementary color of a main color tone in the enhanced region.

According to the display apparatus provided by one or more embodiments of the present disclosure, the display apparatus further includes a main color tone determining portion, and the main color tone determining portion is configured to determine the main color tone in at least a part of the enhanced region.

According to the display apparatus provided by one or more embodiments of the present disclosure, the main color tone determining portion is configured to acquire grayscale values of all sub-pixels of a same color in at least a part of the enhanced region; obtain an average value of the grayscale values of the sub-pixels of a same color in at least a part of the enhanced region, by calculating, so as to obtain average values of the grayscale values of the sub-pixels of different colors; and obtain a color value as the main color tone according to the average values of the grayscale values of the sub-pixels of the different colors.

According to the display apparatus provided by one or more embodiments of the present disclosure, the display enhanced processing includes forming an enclosed line at an edge of the enhanced region or forming a highlighted background in the enhanced region.

According to the display apparatus provided by one or more embodiments of the present disclosure, the display enhanced processing further includes displaying the enclosed line or the highlighted background in a flashing manner.

According to the display apparatus provided by one or more embodiments of the present disclosure, the indication signal receiver includes a plurality of photosensitive units, and the first display portion includes the plurality of photosensitive units.

According to the display apparatus provided by one or more embodiments of the present disclosure, the indication point is a point projected on the first display portion by a light sensing indicator.

According to the display apparatus provided by one or more embodiments of the present disclosure, the display apparatus further includes a second display portion, and the second display portion is configured to receive the signal of the second image to form the second image including a display enhanced portion.

According to the display apparatus provided by one or more embodiments of the present disclosure, the second display portion includes a projection device or a display panel.

At least one embodiment of the present disclosure further provides a display method, which includes: displaying a first image by a first display portion; projecting an indication point on the first image, acquiring a position of the indication point in a region where the first image is located; determining an enhanced region according to the position of the indication point in the region where the first image is located; performing a display enhanced processing on the enhanced region according to a signal of the first image to form a signal of a second image, and outputting the signal of the second image.

According to the display method provided by one or more embodiments of the present disclosure, a region of the first image other than the enhanced region is not enhanced in display.

According to the display method provided by one or more embodiments of the present disclosure, the method further includes: receiving the signal of the second image by a second display portion, and displaying the second image including a display enhanced portion by the second display portion.

At least one embodiment of the present disclosure further provides an image processing device, which includes: a processor; a memory; and computer program instructions stored in the memory, which, when executed by the processor, cause the processor to execute steps of: receiving a position signal of an indication point in a region where a first image is located; determining an enhanced region according to the position signal; performing a display enhanced processing on the enhanced region according to a signal of the first image to form a signal of a second image.

At least one embodiment of the present disclosure further provides a computer program product for image processing, which includes a computer readable storage medium on which computer program instructions are stored, the computer program instruction being executed by a processor to cause the processor to: receive a position signal of an indication point in a region where a first image is located; determine an enhanced region according to the position signal; and perform a display enhanced processing on the enhanced region according to a signal of the first image to form a signal of a second image.

BRIEF DESCRIPTION OF THE DRAWINGS

In order to clearly illustrate the technical solutions of the embodiments of the present disclosure, the drawings of the embodiments will be briefly described in the following; it is obvious that the described drawings are only related to some embodiments of the present disclosure without constituting any limitation thereto.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can acquire other embodiment(s), without any inventive work, which should be within the protection scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In view of a case where it is generally inconvenient to use a laser pointer in a large-screen projection, embodiments of the present disclosure provide a display apparatus, which can enhance the display of a portion that needs to be enhanced on a projection screen or a display panel, and determine an enhanced color tone according to a main color tone of an image at a position indicated by a laser pointer to realize controlled display.

Figure 1A:
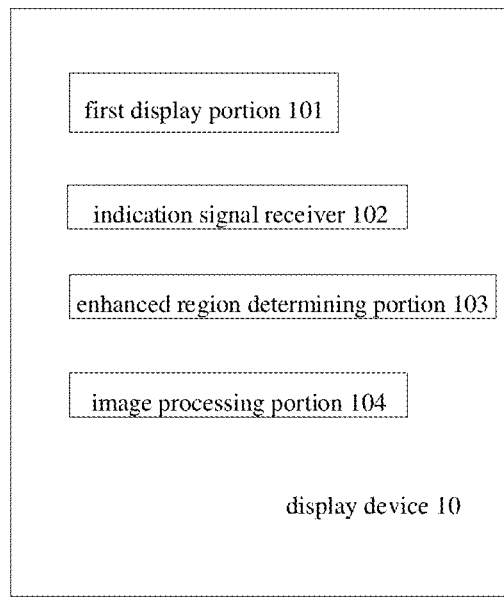
FIG. 1A is a schematic diagram of a display apparatus provided by an embodiment of the present disclosure.

At least one embodiment of the present disclosure provides a display apparatus, as illustrated in FIG. 1A, the display apparatus includes a first display portion 101, an indication signal receiver 102, an enhanced region determining portion 103, and an image processing portion 104.

Figure 1B:
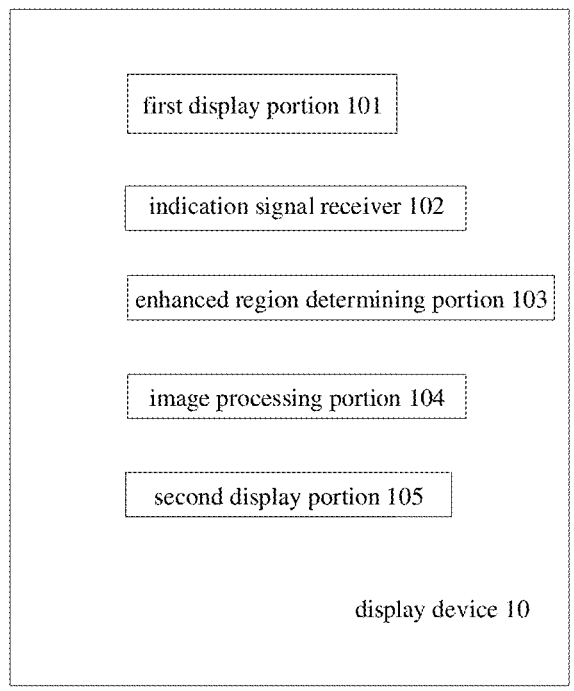
FIG. 1B is a schematic diagram of a display apparatus provided by another embodiment of the present disclosure.

As illustrated in FIG. 1B, the display apparatus may further include a second display portion 105. It should be noted that the display apparatus provided by the embodiment of the present disclosure may be not provided with the second display portion 105, and in this case, the first display portion 101 of the display apparatus may be used to form and output a signal of the second image.

Figure 2:
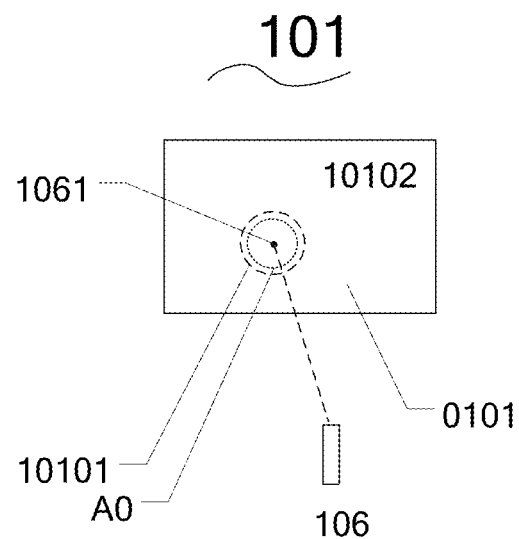
FIG. 2 is a schematic diagram illustrating a first display portion of a display apparatus provided by an embodiment of the present disclosure.

As illustrated in FIG. 2, the first display portion 101 is configured to display a first image 0101. A displayed image of the first image 0101 is not illustrated in FIG. 2. For example, an indication point 1061 is a point projected on the first display portion 101 by an indicator 106. For example, the indicator 106 may be a light sensing indicator, for further example, the indicator 106 may be a laser pointer, without limited thereto. For example, the first display portion 101 may include an operating system, a display panel, and the like.

Figure 3:
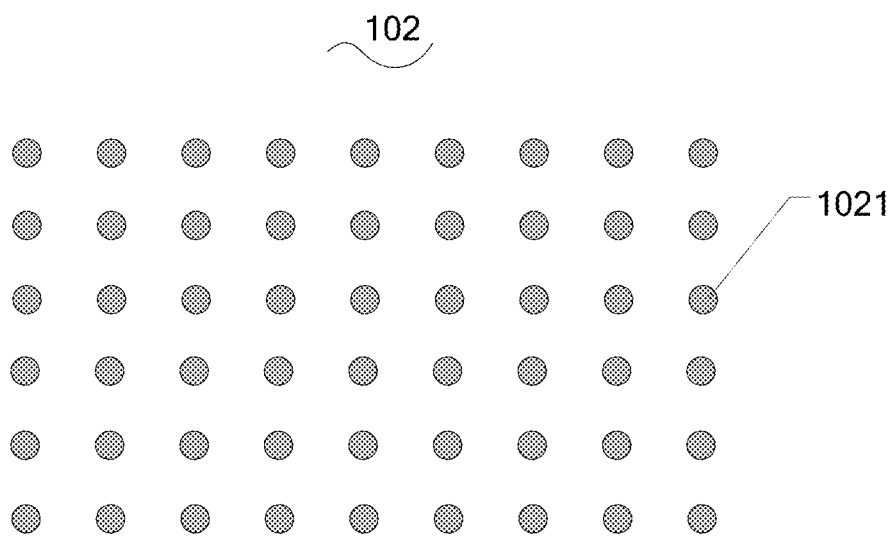
FIG. 3 is a schematic diagram illustrating an indication signal receiver of a display apparatus provided by an embodiment of the present disclosure.

As illustrated in FIG. 3, the indication signal receiver 102 may include a plurality of light sensing units 1021, and the plurality of light sensing units 1021 may be arranged in an array. The indication signal receiver 102 may be configured to acquire a position of an indication point 1061 in a region where the first image 0101 (referring to FIG. 2) is located and to send a position signal according to the position of the indication point 1061. For example, the indication signal receiver 102 can identify an electrical change of the light sensing units 1021, such as a change in current or voltage, and determine a position of the light sensing unit 1021 having the electrical change as the position of the indication point 1061. For example, the first display portion 101 may include the indication signal receiver 102, that is, the first display portion 101 includes the plurality of light sensing units.

Figure 4:
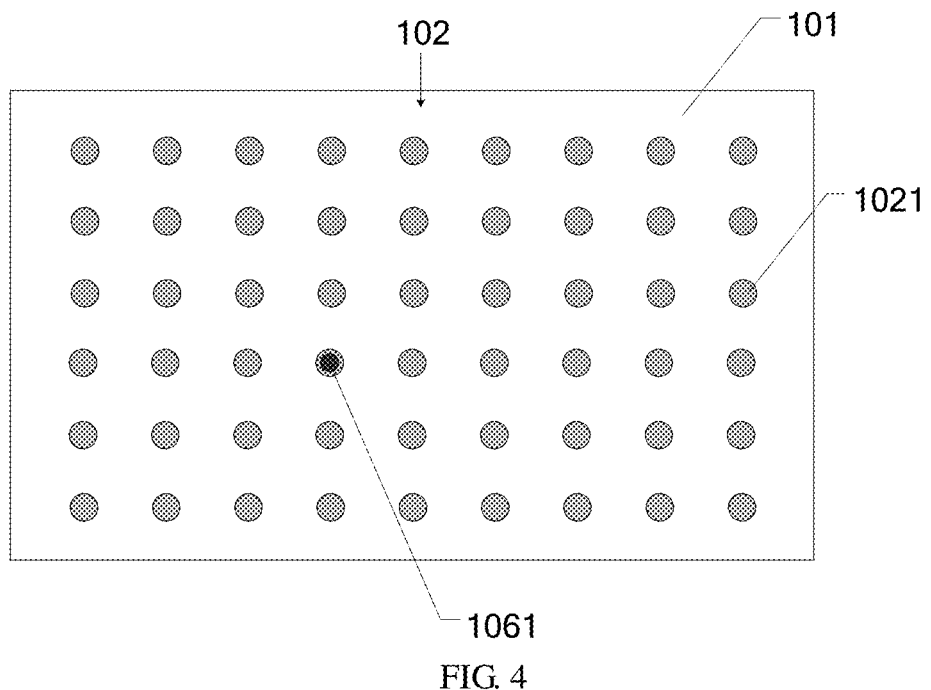
FIG. 4 is a schematic diagram illustrating a first display portion, including an indication signal receiver, of a display apparatus provided by an embodiment of the present disclosure.

FIG. 4 illustrates the case where the indicator 106 is projected onto the indication signal receiver 102 of the first display portion 101. For example, in the case where the indication point 1061 (referring to FIG. 2) covers at least two light sensing units 1021, the indication signal receiver 102 can identify electrical changes of the at least two light sensing units 1021 and determine a position of a geometric center of the at least two light sensing units 1021 as the position of the indication point 1061. For example, the light sensing unit 1021 may be a photodiode, without limited thereto. For example, the indicator 106 may be a laser pointer, and the laser pointer can emit laser light and/or infrared rays. The light sensing unit 1021 on the first display portion 101 may be, for example, an infrared signal sensing unit, without limited thereto.

For example, the first display portion 101 may include an array substrate and an opposing substrate arranged opposite to the array substrate, and the indication signal receiver 102 may be arranged on the array substrate for receiving an indication signal, such as a laser signal and/or an infrared signal. For example, the light sensing units 1021 may be fabricated in a same layer as a thin film transistor (TFT), without adding an additional process, thereby reducing the cost. For example, each of the plurality of light sensing units includes an upper electrode, a photosensitive material, and a lower electrode, and the upper electrode may be formed by one same patterning process as a source-drain metal, and the lower electrode may be formed by one same patterning process as a gate electrode, without limited thereto.

For example, the plurality of light sensing units may be connected to a driving circuit (IC) via signal lines, respectively, and the driving IC may transmit a signal to a downstream component, for example, to the enhanced region determining portion 103 (as illustrated in FIG. 1A).

For example, the light sensing units may also be arranged on other positions of the first display portion, such as on the opposing substrate. The opposing substrate may be a color filter substrate. Alternatively, the indication signal receiver 102 may be not located on the first display portion 101.

As illustrated in FIG. 2, the enhanced region determining portion 103 is configured to determine an enhanced region 10101 (referring to FIG. 2) according to the position signal. For example, the enhanced region 10101 is a region needed to be enhanced/highlighted in display. The enhanced region 10101 is a region determined according to the position of the indication point 1061 within the region where the first image 0101 is located, and the enhanced region 10101 may surround the indication point 1061. For example, the enhanced region 10101 is a region that expands outward with the indication point 1061 as a center point. For example, in order to have a better effect of enhancement in display, an area of the enhanced region 10101 may be 5/10,000 to 5% of an area of the first image 0101. For example, a region of the first image 0101 other than the enhanced region 10101, may be regarded as a non-enhanced region 10102. For example, in the first image 0101, the enhanced region 10101 may be a dummy region, and the determination of the enhanced region does not affect the display of the first image 0101 on the first display portion 101.

The image processing portion 104 is configured to perform a display enhanced processing on the enhanced region 10101 (referring to FIG. 2) according to a signal of the first image 0101 to form a signal of a second image 0105 (referring to FIG. 5), and is further configured to output the signal of the second image 0105. A displayed image of the second image 0105 is not illustrated in FIG. 5. For example, a region of the first image 0101 other than the enhanced region 10101 (referring to FIG. 2) is not enhanced in display. That is, the non-enhanced region 10102 (referring to FIG. 2) is not enhanced in display.

Figure 5:
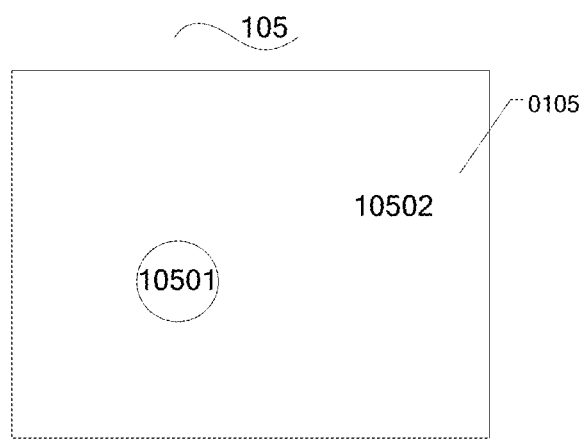
FIG. 5 is a schematic diagram illustrating a second display portion of a display apparatus provided by an embodiment of the present disclosure.

As illustrated in FIG. 5, the second display portion 105 is configured to receive the signal of the second image 0105 to form the second image 0105 including a display enhanced portion 10501. In the second image 0105, in addition to the display enhanced portion (display enhanced region) 10501, a display non-enhanced portion (display non-enhanced region) 10502 is also included. For example, except that the display enhanced portion 10501 is enhanced in display, a remaining region of the second image 0105, such as the display non-enhanced portion 10502, is not enhanced in display.

Figure 6:
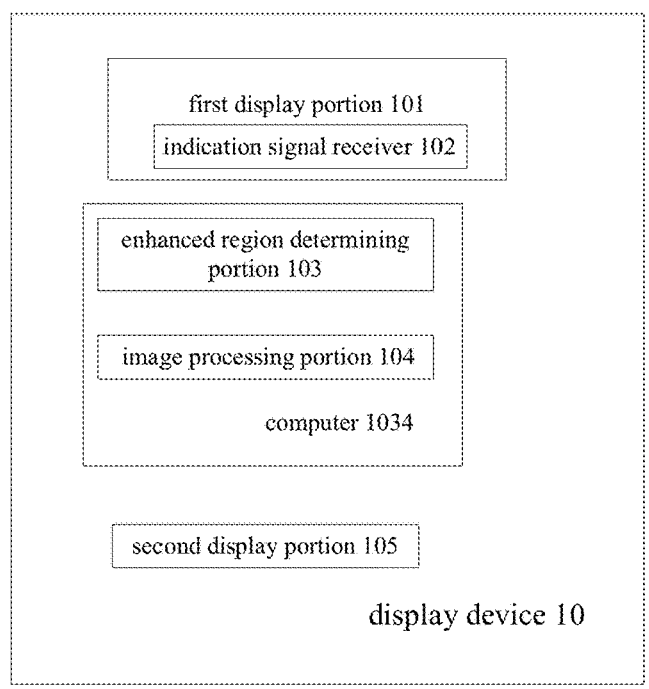
FIG. 6 is a schematic diagram of a display apparatus provided by another embodiment of the present disclosure.

For example, as illustrated in FIG. 6, the functions of the enhanced region determining portion 103 and the image processing portion 104 may be implemented by one or more computers 1034, and the computers 1034 may be general purpose computing devices or special purpose computing devices. The display apparatus provided by the embodiment of the present disclosure is not limited to that as illustrated in FIG. 6, and for example, a function realized by the computer may be realized by the first display portion 101.

According to the display apparatus provided by an embodiment of the present disclosure, as illustrated in FIG.

7A, the second display portion 105 includes a projection device 1051. For example, the projection device 1051 may include a projector. For example, a projected light ray 1053 of the projection device 1051 is projected onto a receiving portion 1052 to form a second image 0105. For example, the receiving portion 1052 may be a projection screen or a surface of a wall.

Figure 7A:
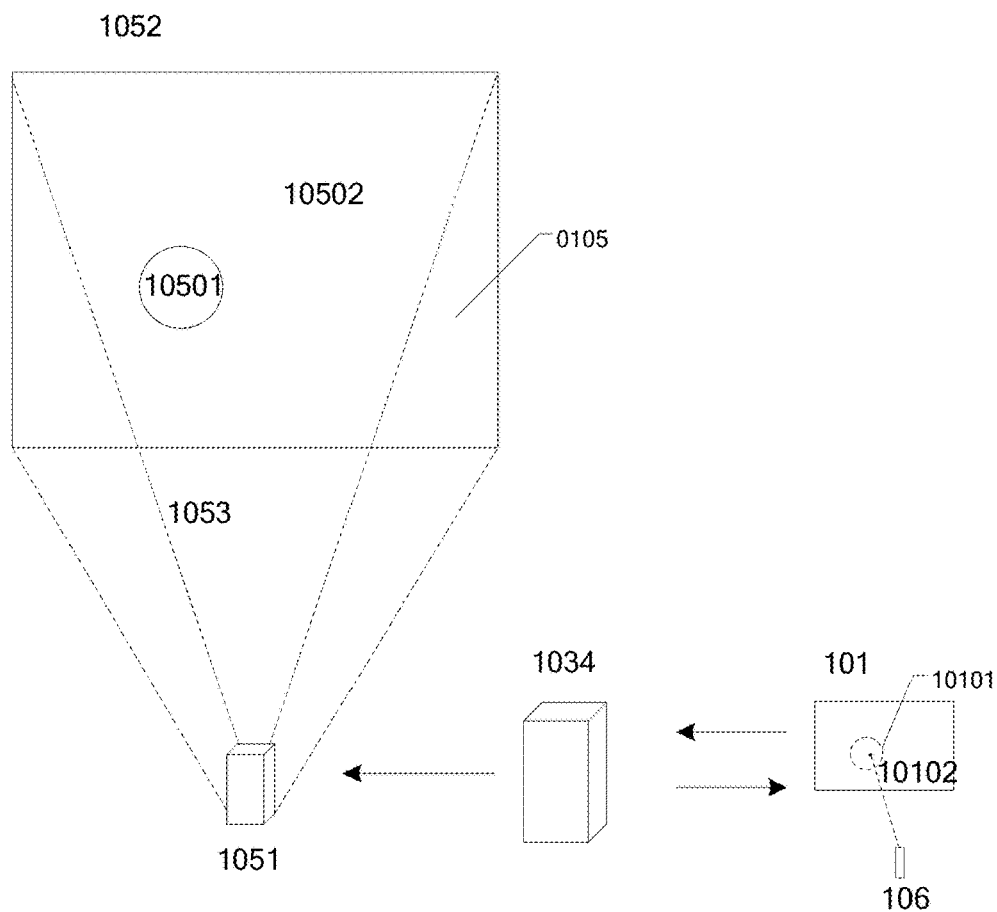
FIG. 7A is a schematic diagram of a display apparatus provided by an embodiment of the present disclosure.
Figure 7B:
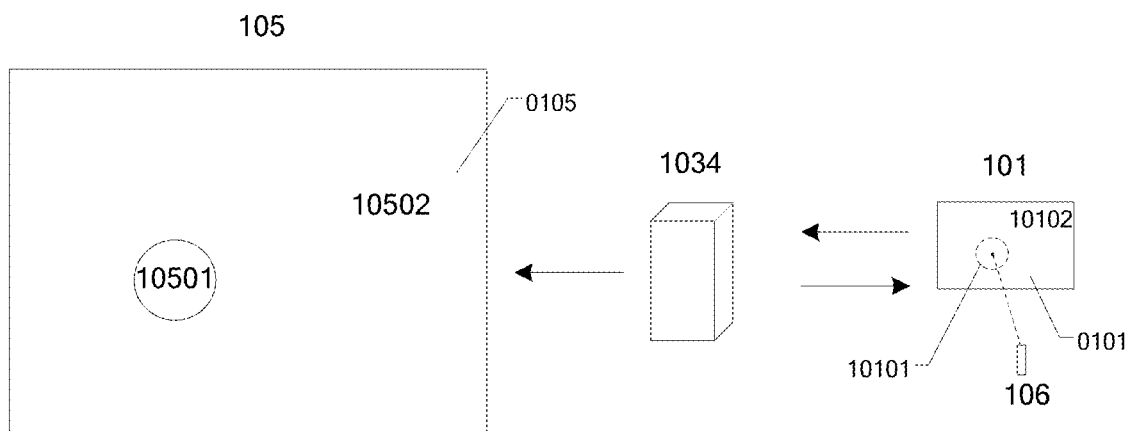
FIG. 7B is a schematic diagram of a display apparatus provided by another embodiment of the present disclosure.

According to the display apparatus provided by an embodiment of the present disclosure, as illustrated in FIG. 7B, the second display portion 105 may include a display panel.

For example, the display panel in the embodiment of the present disclosure may include a liquid crystal display panel or an organic light-emitting diode display panel, without limited thereto.

For example, as illustrated in FIG. 7A and FIG. 7B, the first image 0101 and the second image 0105 are displayed by different display components, respectively.

In the embodiment of the present disclosure, the indication point 1061 is indicated on the first display portion 101, the first image 0101 is formed on the first display portion 101, and the position signal of the indication point 1061 has a corresponding relationship with the signal of the first image to facilitate process of signals to form the signal of the second image. Compared with the case where the indication point is indicated on the second display portion 105 (the second display portion 105 is indicated by the indicator 106), the step of adjusting a position coordinate determined by the second display portion to a position coordinate of the first image can be omitted. Moreover, the position signal provided by the embodiment of the present disclosure is easy to correspond to the signal of the first image, the signal correspondence is more accurate, the display enhanced region is more closely matched with the enhanced region, and the signal processing step is simpler and faster.

Figure 8:
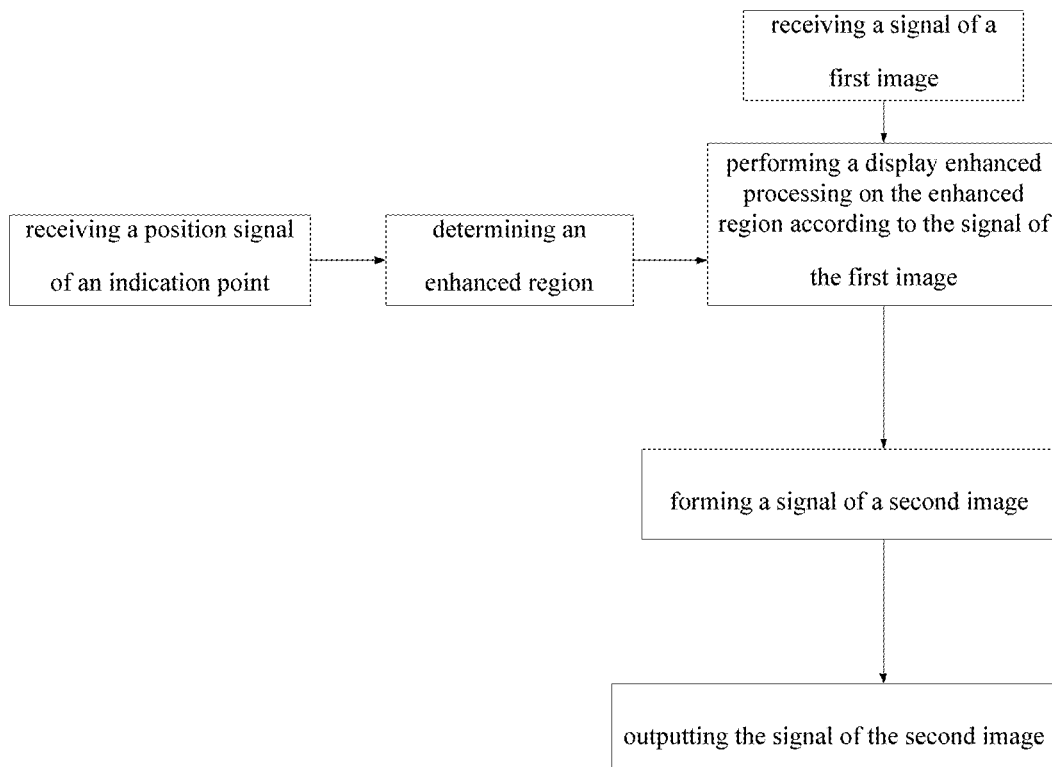
FIG. 8 is a schematic diagram illustrating a signal processing flow of a display apparatus provided by an embodiment of the present disclosure.

According to the display apparatus provided by an embodiment of the present disclosure, a flow of forming the signal of the second image by the signal of the first image may be as illustrated in FIG. 8. The flow includes: determining an enhanced region according to the received position signal of the indication point, performing a display enhanced processing on the enhanced region according to the received signal of the first image to form a signal of the second image, and outputting the signal of the second image.

For example, referring to FIG. 7A and FIG. 7B, the second image 0105 is an enlarged image of the first image 0101, and the second image 0105 includes a display enhanced portion 10501. For further example, the second image 0105 is an enlarged image of the first image 0101 in proportion, and enlarged ratios at various positions of the second image are the same. The enlarged ratio is not limited in the embodiment of the present disclosure. For example, the display enhanced portion 10501 is also an enlarged image of the displayed image in the enhanced region 10101 of the first image 0101. For example, except the enhanced region 10101 and the corresponding display enhanced portion 10501, the image which is displayed in the first image 0101 and displayed by the first display portion 101 is the same as the image which is displayed in the second image 0105 and displayed by the second display portion 105, and the size of the first image may be different to the size of the second image.

Figure 9:
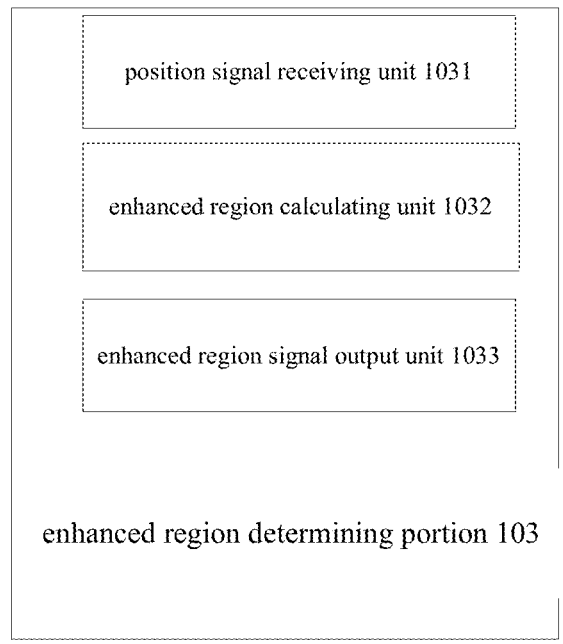
FIG. 9 is a schematic diagram illustrating an enhanced region determining portion of a display apparatus provided by an embodiment of the present disclosure.

For example, as illustrated in FIG. 9, the enhanced region determining portion 103 may include a position signal receiving unit 1031, an enhanced region calculating unit 1032, and an enhanced region signal output unit 1033. For example, the position signal receiving unit 1031 is configured to receive the position signal, the enhanced region calculating unit 1032 is configured to determine an area of the enhanced region, and the enhanced region signal output unit 1033 is configured to output a region-signal of the enhanced region.

Figure 10:
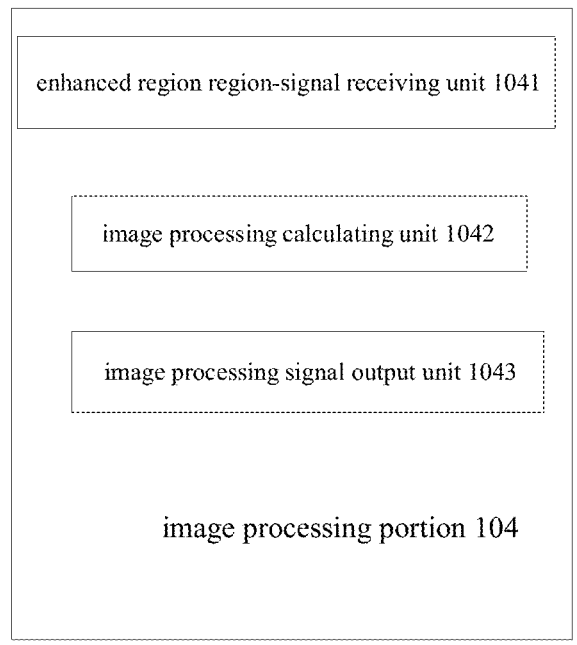
FIG. 10 is a schematic diagram illustrating an image processing portion of a display apparatus provided by an embodiment of the present disclosure.

For example, as illustrated in FIG. 10, the image processing portion 104 may include an enhanced region region-signal receiving unit 1041, an image processing calculating unit 1042, and an image processing signal output unit 1043. For example, the enhanced region region-signal receiving unit 1041 is configured to receive the region-signal of the enhanced region, the image processing calculating unit 1042 is configured to perform image signal processing, for example, the image processing calculating unit 1042 is configured to perform the display enhanced processing on the enhanced region 10101 (referring to FIG. 2) according to the signal of the first image 0101 and the position signal of the indication point to form the signal of the second image 0105, and the image processing signal output unit 1043 is configured to output the signal of the second image 0105.

The display apparatus provided by the embodiment of the present disclosure can determine a position in an image that needs to be enhanced in display, and can realize enhancement in display of a part to be enhanced in display, thereby improving the display effect, and improving the user's experience.

Figure 11:
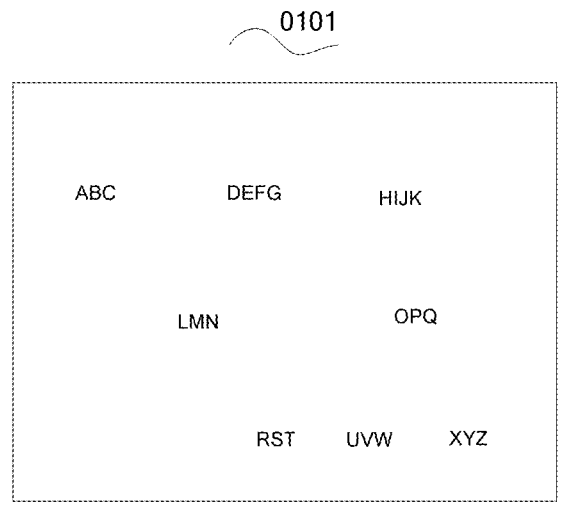
FIG. 11 is a schematic diagram of a first image displayed by a display apparatus provided by an embodiment of the present disclosure.

For example, the displayed image of the first image 0101 can be as illustrated in FIG. 11, by way of example, however, the displayed image of the first image 0101 is not limited to the displayed image as illustrated in FIG. 11, and the first image 0101 can be arbitrary displayed images.

Figure 12:
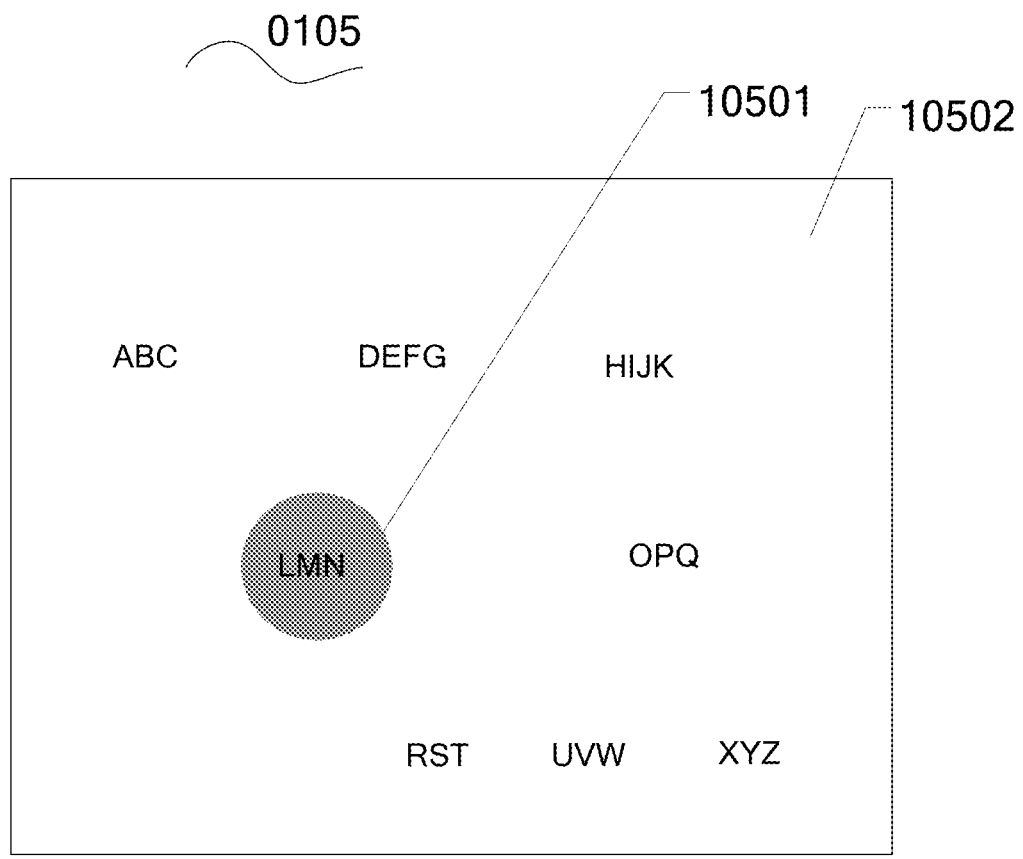
FIG. 12 is a schematic diagram of a second image displayed by a display apparatus provided by an embodiment of the present disclosure.

According to the display apparatus provided by an embodiment of the present disclosure, the display enhanced processing includes an adjustment in color of the enhanced region 10101 (referring to FIG. 2). For example, the adjustment in color of the enhanced region 10101 (referring to FIG. 2) includes the adjustment in color of a background of the enhanced region 10101. For example, a highlighted background can be formed in the enhanced region 10101. For example, the highlighted background formed in the enhanced region 10101 may be in a predetermined color. For example, upon the enhanced region being display enhanced processed, a color of the highlighted background formed in the enhanced region 10101 may be any optional color such as red, pink, green, yellow, or the like. For example, the highlighted background may be circular, without limited thereto. The display enhanced portion 10501 in the second image 0105 correspondingly formed by the display enhanced processing for adjusting the color of the enhanced region may be as illustrated in FIG. 12. For example, the color of the background of the enhanced region refers to a color of a background of a content (such as text or figure) displayed in the enhanced region.

Figure 13:
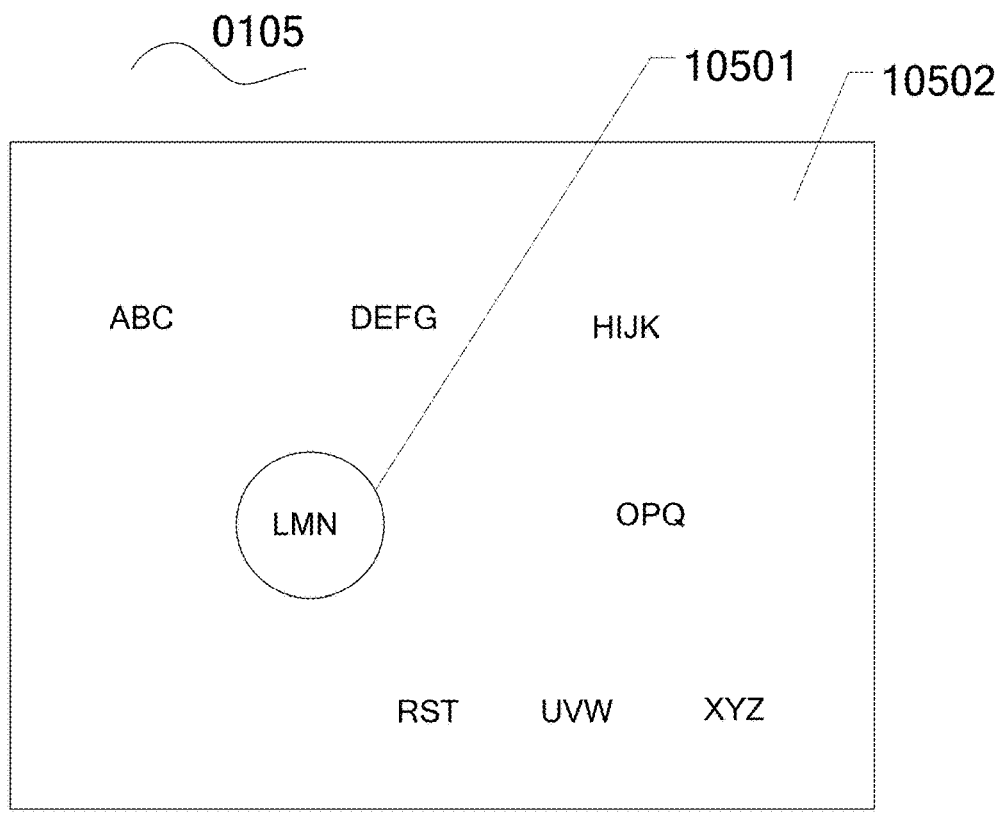
FIG. 13 is a schematic diagram of a second image displayed by a display apparatus provided by another embodiment of the present disclosure.

According to the display apparatus provided by an embodiment of the present disclosure, the display enhanced processing includes forming an enclosed line at an edge of the enhanced region 10101 (referring to FIG. 2). The display enhanced portion 10501 in the second image 0105 correspondingly formed by the display enhanced processing for forming the enclosed line at the edge of the enhanced region may be as illustrated in FIG. 13.

Figure 14:
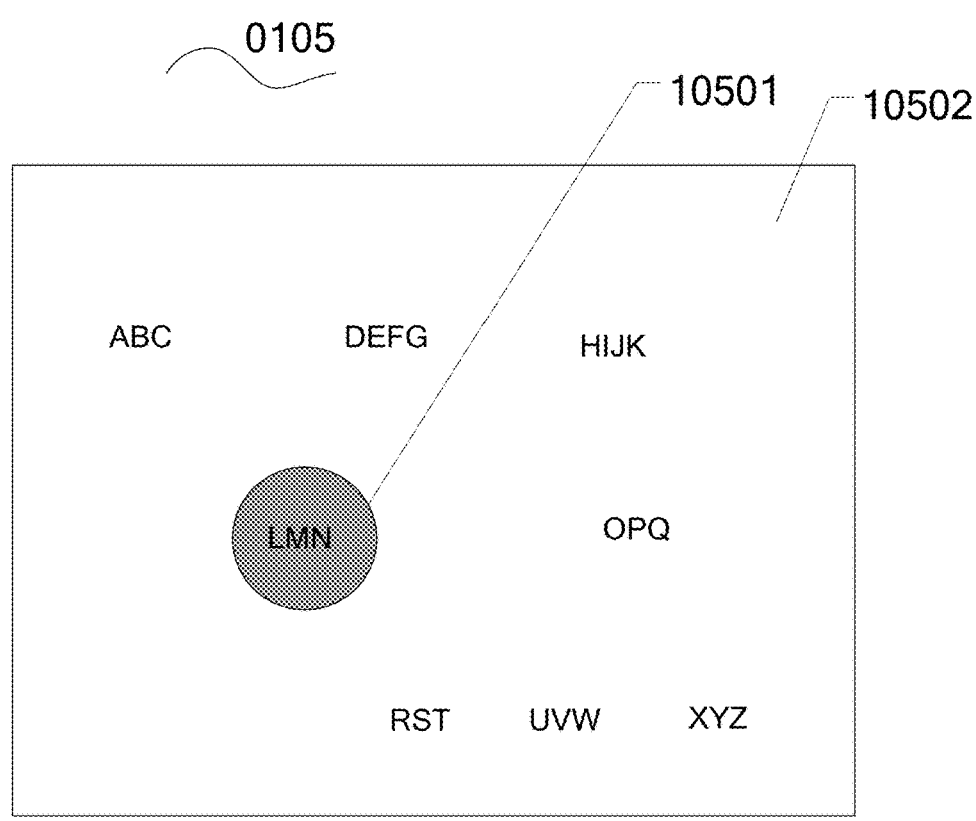
FIG. 14 is a schematic diagram of a second image displayed by a display apparatus provided by another embodiment of the present disclosure.

According to the display apparatus provided by an embodiment of the present disclosure, the display enhanced processing may include forming an enclosed line at an edge of the enhanced region 10101 (referring to FIG. 2) and forming a highlighted background in the enhanced region 10101. The display enhanced portion 10501 in the second image 0105 correspondingly formed after the display enhanced processing can be as illustrated in FIG. 14.

According to the display apparatus provided by an embodiment of the present disclosure, in order to allow the position of the display enhanced portion 10501 to be viewed easily by the viewer, the display enhanced processing may further include displaying the enclosed line or the highlighted background in a flashing manner.

In addition to adjusting the highlighted background into a predetermined color, the color of the highlighted background may be adjusted according to a displayed image of the first image 0101 in the enhanced region 10101.

According to the display apparatus provided by an embodiment of the present disclosure, the adjustment in color of the background of the enhanced region 10101 includes adjusting a color of the background in the enhanced region 10101 into a complementary color of a main color tone in the enhanced region 10101, or into a color between a main display color in the enhanced region 10101 and a complementary color of a main color tone in the enhanced region 10101.

Figure 15:
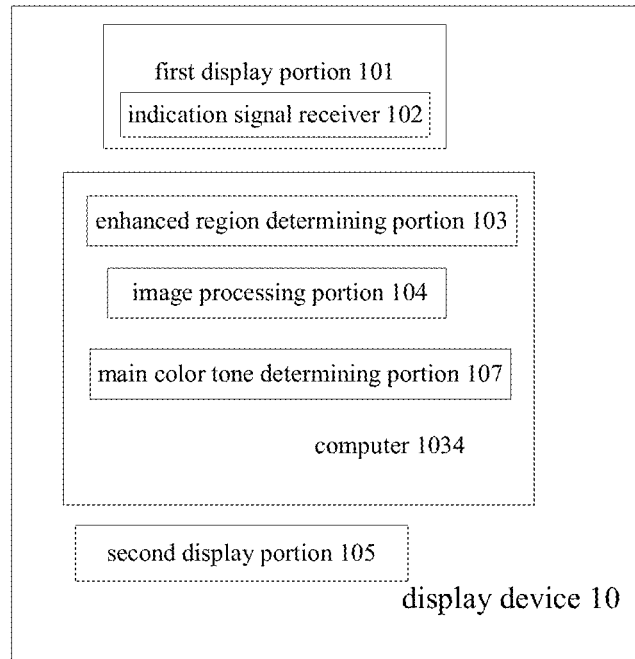
FIG. 15 is a schematic diagram of a display apparatus provided by another embodiment of the present disclosure.

FIG. 15 is a schematic diagram of a display apparatus according to another embodiment of the present disclosure. The display apparatus provided by an embodiment of the present disclosure, as illustrated in FIG. 2 and FIG. 15, further includes a main color tone determining portion 107 configured to determine the main color tone in at least a part of the enhanced region 10101. For example, at least a part of the enhanced region 10101 may be regarded as a main color tone judging region A0 (referring to FIG. 2). An area of the main color tone judging region A0 may be equal to or smaller than the area of the enhanced region 10101. For example, the area of the main color tone judging region may be determined according to a displayed image in the enhanced region 10101. The following is described with reference to the case where the enhanced region 10101 is the main color tone judging region, by way of example.

Figure 16:
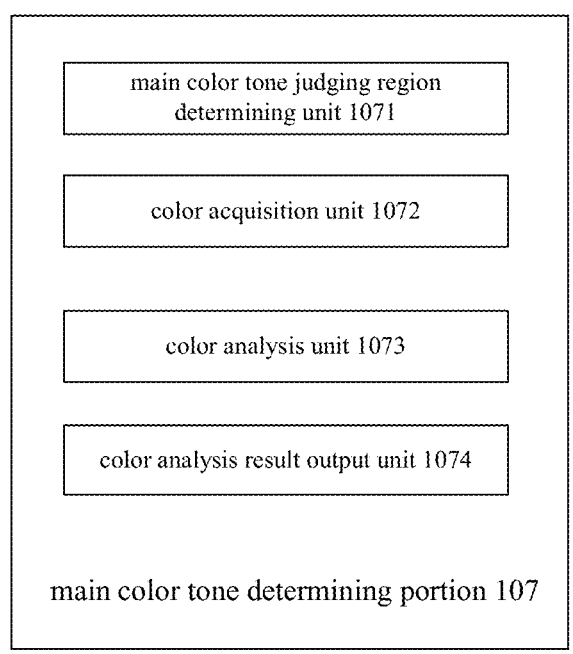
FIG. 16 is a schematic diagram of a main color tone determining portion of a display apparatus provided by an embodiment of the present disclosure.

According to the display apparatus provided by an embodiment of the present disclosure, as illustrated in FIG. 16, the main color tone determining portion 107 may include a main color tone judging region determining unit 1071, a color acquisition unit 1072, a color analysis unit 1073, and a color analysis result output unit 1074.

Figure 17:
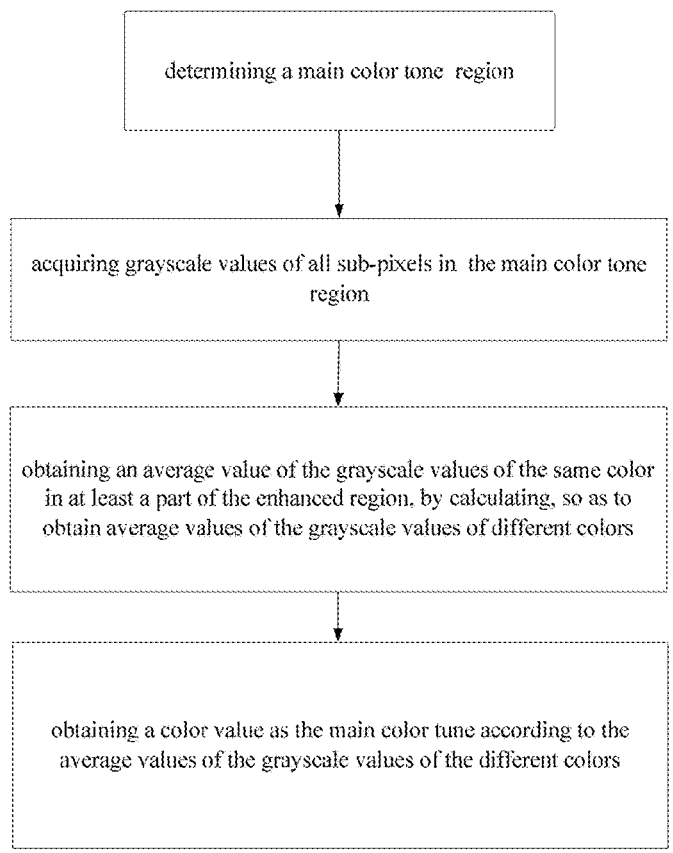
FIG. 17 is a schematic diagram illustrating a workflow of a main color determining portion of a display apparatus provided by an embodiment of the present disclosure.

FIG. 17 illustrates a workflow of the main color tone determining portion 107. For example, as illustrated in FIG. 17, the main color tone judging region determining unit 1071 may be configured to determine the main color tone judging region, that is, to determine a position where the main color tone judging region is located. The color acquisition unit 1072 may be configured to acquire grayscale values of all sub-pixels of a same color in the main color tone judging region (at least a part of the enhanced region). The color analysis unit 1073 is configured to obtain an average value of the grayscale values of the sub-pixels of a same color in the main color tone judging region (at least a part of the enhanced region 10101), by calculating, so as to obtain average values of the grayscale values of the sub-pixels of different colors; and obtain a color value as the main color tone according to the average values of the grayscale values of the sub-pixels of the different colors. The color analysis result output unit 1074 is configured to output the main color tone of the enhanced region.

For example, the main color tone of the main color tone judging region may include a main display color of the main color tone judging region, one of a plurality of main display colors of the main color tone judging region, or a composite color of a plurality of main display colors of the main color tone judging region, without limited thereto.

For example, the main color tone determining portion 107 can transmit the main color tone of the enhanced region to the image processing portion 104 (referring to FIG. 6). Referring to FIG. 2, FIG. 6, FIG. 11, and FIG. 12, the image processing portion 104 can determine the main color tone of the display enhanced portion 10501 according to the main color tone of the enhanced region 10101.

The function of the main color tone determining unit 107 can also be realized by a computer or by a plurality of computers, and the computer may be a general purpose computing device or a special purpose computing device.

Figure 18:
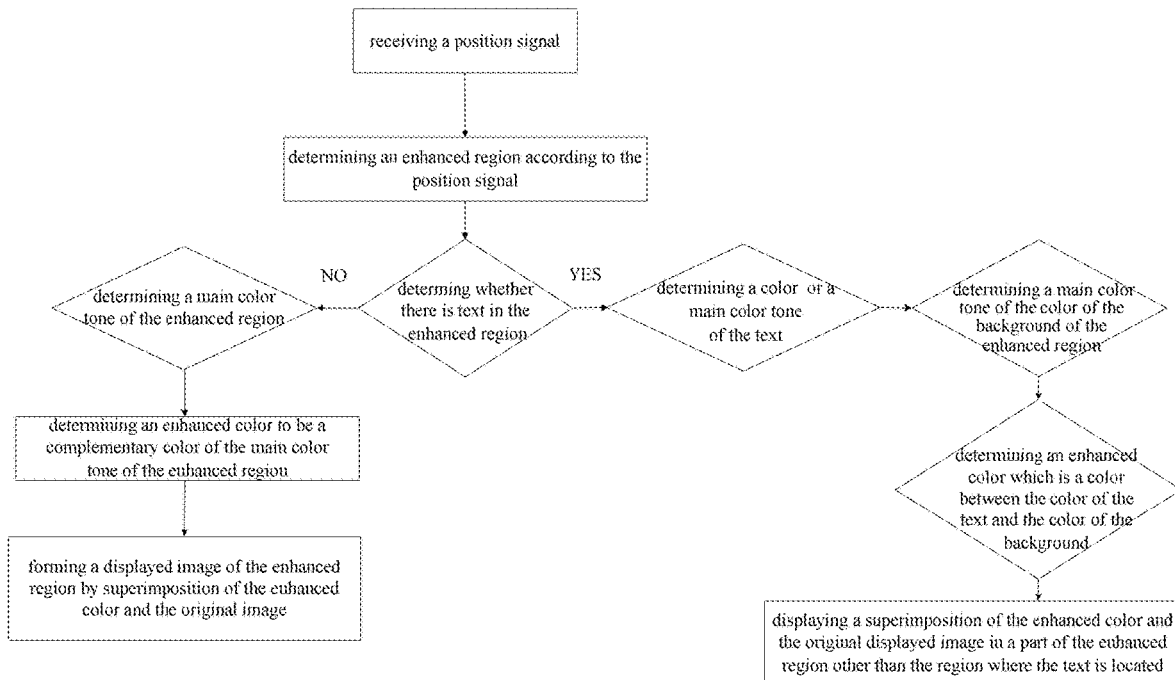
FIG. 18 is a schematic diagram illustrating a workflow of a display apparatus provided by an embodiment of the present disclosure.

According to the display apparatus provided by an embodiment of the present disclosure, as illustrated in FIG. 18, a flow of determining the color of the main color tone judging region (for example, the position to be highlighted) is as follows:

Firstly, determining whether there is text in the enhanced region.

If there is text in the enhanced region, it is considered that the speaker needs to enhance the text. Considering that a color of the text is generally complementary to a color of the background, a color between the color of the text and the color of the background is selected as the enhanced color. Then, a region of the enhanced region other than the region where the text is located can be adjusted to the enhanced color, or the region of the enhanced region other than the region where the text is located can be displayed by superimposing the enhanced color and an original image.

If there is no text in the enhanced region, it is considered that the speaker needs to enhance a display of a figure in the enhanced region; in this case, a main color tone of the image can be determined firstly, and then a complementary color which is complementary to the main color tone of the enhanced region is determined to be as the enhanced color.

For example, an image displayed in the display enhanced portion 10501 of the second image 0105 is a superimposition of an image displayed in the enhanced region of the first image and an enhanced image (enhanced color).

For example, a superimposition ratio is that a color tone of the displayed image of the enhanced region in the first image is 30%-50% of a color of the displayed image of the display enhanced portion 10501.

For example, the method of determining the main color tone of the displayed image of the enhanced region 10101 in the first image 0101 is as follows.

Firstly, determining a range of a region in which the main color tone needs to be determined in an entirety of the first image, and the range of the region is defined as a main color tone judging region. For example, the manner of determining the main color tone judging region may be as described above.

Acquiring grayscale values of all the sub-pixels (not the grayscale value of a single sub-pixel) of the same color in the main color tone judging region.

Obtaining an average value of the grayscale values of the sub-pixels of the same color in the main color tone judging region, so as to obtain average values of the grayscale values of the sub-pixels of different colors. For example, the average values of the grayscale values of the red (R) sub-pixels, green (G) sub-pixels, and blue (B) sub-pixels in the main color tone judging region are obtained, by calculating. For example, the average value of grayscale values of all the R pixels in the main color tone judging region is obtained by calculating, the average value of grayscale values of all the G pixels in the main color tone judging region is obtained by calculating, and the average value of grayscale values of all the B pixels in the main color tone judging region is obtained by calculating.

Obtaining a color value, which is an average value of the grayscale values of the sub-pixels R, G and B, acquired by calculating (three primary colors are mixed into one color), as the main color tone of the main color tone judging region.

The embodiment of the present disclosure is described with reference to the case where the three primary colors are red, green and blue, by way of example, and the sub-pixels may also adopt other colors, which are not limited by the embodiments of the present disclosure.

Figures 19, 20:
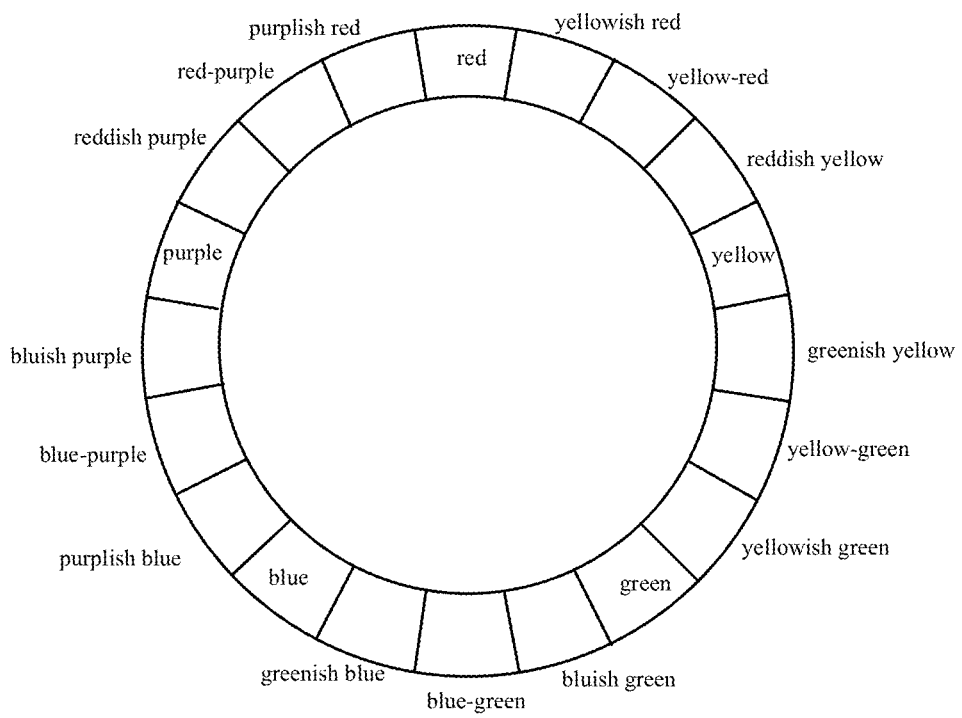
FIG. 19 is a schematic diagram of a hue circle provided by an embodiment of the present disclosure.
FIG. 20 is a schematic diagram of an image processing method provided by an embodiment of the present disclosure.

For example, a main display color of the enhanced region 10101 may be firstly determined, and then a complementary color of the main display color may be used as a color of a background to achieve enhancement in display. FIG. 19 illustrates a hue circle. The complementary colors are defined as: if two colors are mixed to form a neutral gray black, then the two colors are complementary colors, and two hues at 180° apart from each other on the hue circle (as illustrated in FIG. 19) are complementary colors. The complementary colors have the following characteristics: in the case where two complementary colors are placed close to each other, the saturation of each color in the visual is enhanced, so as to allow the hue and purity of each color to be viewed strong. This is due to the physiological balance of the human eye's requirements for color, when any color is viewed, a complementary color of this color is always needed; therefore, when two complementary colors close to each other are viewed, the edge that the two complementary colors intersect with each other displays their complementary colors, respectively, so that the two complementary colors are enhanced in visual. In this case, by changing the color of the enhanced region (the position of displaying enhanced) into a complementary color of the main color tone of the enhanced region, a viewer can see the part that the speaker needs to be enhanced easily and clearly.

For example, the implementation of complementary colors is as follows:

the color acquisition unit 1072 may be configured to acquire a position of the main color tone judging region (at least a part of the enhanced region), the color analysis unit 1073 may be configured to analyze the main color tone of the main color tone judging region to determine a complementary color, and the color analysis result output unit 1074 is configured to output the complementary color of the main color tone of the enhanced region. The color analysis result output unit 1074 can transmit a signal of the complementary color of the main color tone of the enhanced region to the image processing unit 104. The image processing unit 104 is configured to provide the signal of the second image that needs to be displayed.

For example, upon the color analysis unit 1073 analyzing to obtain that the main display color includes a plurality of colors, the color analysis unit 1073 is further configured to analyze a color of a background of a displayed image and a color of a content of the displayed image, such as a black text on a white background. In this case, an enhanced color may be a complementary color which is a color between the color of the background and the color of the content. Or, if an area of a certain color is large, for example, as large as 80%, then a complementary color of this color is taken as an enhanced color.

An embodiment of the present disclosure can detect an indication position of a displayed image by a user in real time by adding an indication signal receiver to the first display portion, and at the same time, the position that needs to be highlighted is determined (determining the enhanced region) after the enhanced region determining portion processes the received position signal, and the signal of the second image may be formed according to the indicated position and the color of the displayed image to achieve enhancement/highlight in display. For example, by changing the color of the position that needs to be enhanced in display into a complementary color of the position needed to be enhanced, a viewer can see the displayed image that is needed to be enhanced by the speaker easily and clearly. For example, a suitable color of the background to highlight the enhanced color can be selected without affecting the display of the image at other positions.

In the display apparatus provided by the embodiment of the present disclosure, a suitable enhanced color can be selected without affecting the display of the image.

According to the display apparatus provided by an embodiment of the present disclosure, a ratio of an area of the enhanced region 10101 to an area of the first image 0101 is equal to a ratio of an area of the display enhanced portion (display enhanced region) 10501 to an area of the second image 0105. For example, a ratio of the area of the enhanced region 10101 to an area of the non-enhanced region 10102 is equal to a ratio of the area of the display enhanced portion (display enhanced region) 10501 to an area of the display non-enhanced portion (display non-enhanced region) 10502. For example, the display enhanced portion 10501 and the display non-enhanced portion/display non-enhanced region 10502 form an entirety of the second image 105, only the color of the display enhanced portion 10501 is adjusted during the enhanced processing. In the case where a size of the second display portion is larger than a size of the first display portion, although the size of the second image 0105 is larger than the size of the first image, the adjustment in size does not caused by the adjustment of the signal during the display enhanced processing.

A display method provided by at least one embodiment of the present disclosure, includes: displaying a first image 0101 by a first display portion 101; projecting an indication point 1061 on the first image 0101, acquiring a position of the indication point 1061 in a region where the first image 0101 is located; determining an enhanced region 10101 according to the position of the indication point 1061 in the region where the first image 0101 is located; performing a display enhanced processing on the enhanced region 10101 according to a signal of the first image 0101 to form a signal of a second image 0105, and outputting the signal of the second image 0105.

The display method provided by an embodiment of the present disclosure may further include receiving the signal of the second image 0105, by the second display portion 105, to form a second image 0105 including a display enhanced portion 10501.

For example, the speaker can use the laser of the laser pointer to point to the first display portion, and the first display portion can receive the position information of the laser pointing to the first image, and transmit the position information to the computer. The enhanced region determining portion of the computer is configured to determine a relationship of the position information with the first image, and the image processing portion provides the signal of the second image including the display enhanced portion according to the signal of the first image and the position information of the indication point. In this way, the position required to be enhanced in display can be highlighted in display (enhanced in display).

According to the display method provided by an embodiment of the present disclosure, the second display portion 105 includes a projection device or a display panel.

According to the display method provided by an embodiment of the present disclosure, a region of the first image 0101 other than the enhanced region 10101 is not enhanced in display.

The display method provided by the embodiment of the present disclosure can be implemented by any of the above display apparatuses. The same or similar aspects between the display method and any of the above display apparatuses can be referred to each other, and repeated portions are omitted herein.

The display apparatus provided by the embodiment of the present disclosure may further include one or more processors and one or more memories. The processor may process the data signals and may include various computing architectures, such as a complex instruction set computer (CISC) architecture, a reduced instruction set computer (RISC) architecture, or an architecture for implementing a combination of multiple instruction sets. The memory may store instructions and/or data executed by the processor. The instructions and/or data may include codes which are configured to achieve some functions or all the functions of one or more portions, units, and devices described in the embodiments of the present disclosure. For example, the memory includes a dynamic random access memory (DRAM), a static random access memory (SRAM), a flash memory, an optical memory, or other memories well known to those skilled in the art.

In some embodiments of the present disclosure, the display apparatus can include codes and programs stored in the memory; and the processor can execute the codes and programs to achieve some functions or all the functions of the portions (components), units, and display apparatuses as described above.

In some embodiments of the present disclosure, a certain portion such as the enhanced region determining portion, the image processing portion, the main color tone judging portion, and a main color determining portion, and a certain unit such as the position signal receiving unit, the enhanced region calculating unit, the enhanced region signal output unit, the enhanced region region-signal receiving unit, the image processing calculating unit, the image processing signal output unit, the main color tone judging region determining unit, the color acquisition unit, the color analysis unit, and the color analysis result output unit may be specialized hardware devices and configured to achieve some functions or all the functions of the various portions (components), units as described above. For example, each portion (component), each unit may be a circuit board or a combination of a plurality of circuit boards and configured to achieve the functions as described above. In an embodiment of the present disclosure, the circuit board or a combination of the plurality of circuit boards may include: (1) one or more processors; (2) one or more non-transitory computer readable memories connected with the processor; and (3) processor-executable firmware stored in the memory.

For example, some functions or all the functions of one or more portions (components), units, devices, may be implemented by software, hardware, firmware, or any combination thereof.

At least one embodiment of the present disclosure provides an image processing method, as illustrated in FIG. 20, which includes:

S201: receiving a position signal of an indication point in a region where a first image is located;

S202: determining an enhanced region according to the position signal;

S203: performing a display enhanced processing on the enhanced region according to a signal of the first image to form a signal of a second image.

For example, the display method provided by the embodiment of the present disclosure may include the image processing method provided by the embodiment of the present disclosure.

At least one embodiment of the present disclosure provides an image processing device, and the image processing device includes: a processor, a memory and computer program instructions stored in the memory, which, when executed by the processor, cause the processor to execute steps of: receiving a position signal of an indication point in a region where a first image is located; determining an enhanced region according to the position signal; performing a display enhanced processing on the enhanced region according to a signal of the first image to form a signal of a second image.

For example, the display apparatus provided by the embodiment of the present disclosure may include the image processing device provided by the embodiment of the present disclosure.

For example, the image processing device may transmit the signal of the formed second image to the second display portion 105, so as to realize enhancement in display.

Figure 21:
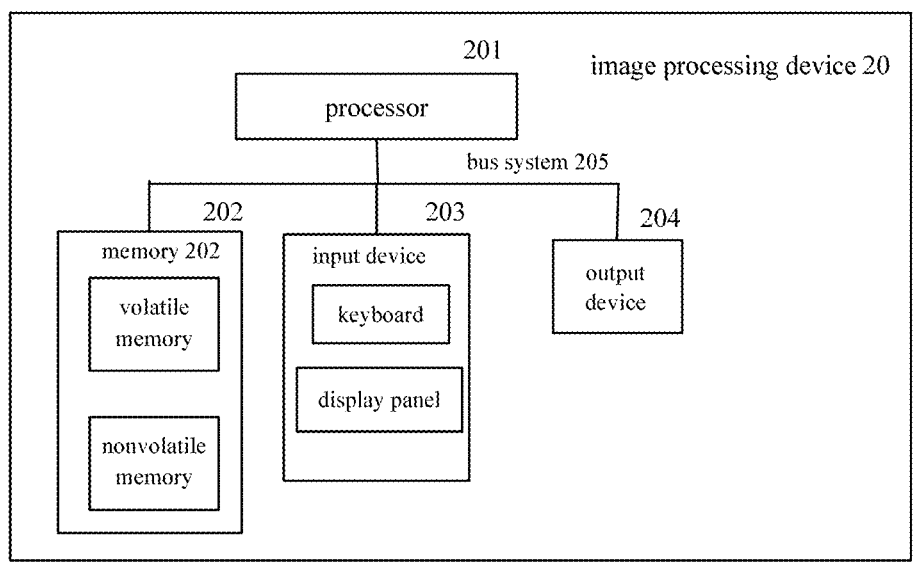
FIG. 21 is a schematic diagram of an image processing device provided by an embodiment of the present disclosure.

For example, as illustrated in FIG. 21, the image processing device includes a processor 201, a memory 202, an input device 203, and an output device 204. These components may be interconnected by a bus system 205 and/or other form of connection mechanism (not illustrated). It should be noted that the components and structures of the image processing device 20 as illustrated in FIG. 21 are merely exemplary and not limitative, and the image processing device 20 may have other components and structures as needed.

The processor 201 can be a central processing unit (CPU) or other form of processing unit with data processing capabilities and/or instruction execution capabilities, and can control other components in the image processing device 20 to perform the desired functions.

The memory 202 can include one or more computer program products, which may include various forms of computer readable storage media, such as volatile memory and/or nonvolatile memory. The volatile memory may include, for example, a random access memory (RAM) and/or a cache or the like. The nonvolatile memory may include, for example, a read only memory (ROM), a hard disk, a flash memory, or the like. One or more computer program instructions may be stored on the computer readable storage medium, and the processor 201 may execute the program instructions to implement the functions of the embodiments of the present disclosure described above and/or other desired functions. Various applications and various data, such as location data, image data, and various data used and/or generated by the application, etc., may also be stored on the computer readable storage medium.

The input device 203 may be a device used by a user to input instructions, and may include one or more selected from the group consisting of a display panel, a keyboard, a mouse, a microphone, a touch screen, and the like. The input instructions include, for example, an indication point projected on the display panel by the indicator.

According to the image processing device provided by an embodiment of the present disclosure, the output device 204 may output the signal of the second image. For example, the output device may output the signal of the second image to the second display portion 105. For example, the image processing device may be combined with the first display portion 101.

According to the image processing device provided by an embodiment of the present disclosure, the output device 204 may include, for example, the second display portion 105. For example, the second display portion 105 can receive the signal of the second image to realize enhancement in display. For example, the image processing device can be combined with the second display portion 105.

At least one embodiment of the present disclosure further provides a computer program product for image processing, which includes a computer readable storage medium on which computer program instructions are stored, the computer program instruction being executed by a processor to cause the processor to: receive a position signal of an indication point in a region where a first image is located; determine an enhanced region according to the position signal; and perform a display enhanced processing on the enhanced region according to a signal of the first image to form a signal of a second image.

In the image processing method and/or the image processing device and/or the computer program product for image processing provided by an embodiment of the present disclosure, the first image may be displayed by the first display portion 101, the indication point may be a point projected on the first display portion 101 by the indicator 106, the position signal of the indication point can be acquired by the indication signal receiver 102, the enhanced region can be acquired by the enhanced region determining portion 103, and the signal of the second image can be formed by the image processing portion 104. However, limitations are not imposed to the embodiments of the present disclosure.

For example, the display apparatus provided by the embodiment of the present disclosure may include a computer program product for image processing provided by an embodiment of the present disclosure. The display method provided by the embodiment of the present disclosure may include the step of applying the computer program product for image processing provided by the embodiment of the present disclosure.

The same or similar aspects between the image processing method/device and the foregoing display apparatus/method provided by at least one embodiment of the present disclosure are omitted herein. For example, the display apparatus provided by the embodiment of the present disclosure may include any of the image processing devices described above.

The following statements should be noted:

(1) Unless otherwise defined, the same reference numeral refers to the same meaning in the embodiments and the accompanying drawings of the present disclosure.

(2) The accompanying drawings involve only the structure(s) in connection with the embodiment(s) of the present disclosure, and other structure(s) can be referred to common design(s).

(3) In case of no conflict, features in one embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A display apparatus, comprising:
   a first display portion configured to display a first image;
   an indication signal receiver configured to acquire a position of an indication point in a region where the first image is located and send a position signal according to the position of the indication point;
   an enhanced region determining portion configured to determine an enhanced region according to the position signal; and
   an image processing portion configured to perform a display enhanced processing on the enhanced region according to a signal of the first image to form a signal of a second image and configured to output the signal of the second image;
   the display enhanced processing comprises an adjustment in color of the enhanced region, the adjustment in color of the enhanced region comprises an adjustment in color of a background of the enhanced region.

2. The display apparatus according to claim 1, wherein a region of the first image other than the enhanced region is not enhanced in display.

3. The display apparatus according to claim 1, wherein the adjustment in color of the background of the enhanced region comprises adjusting a color of the background in the enhanced region into a complementary color of a main color tone in the enhanced region, or into a color between a main display color in the enhanced region and a complementary color of a main color tone in the enhanced region.

4. The display apparatus according to claim 3, further comprising a main color tone determining portion configured to determine the main color tone in at least a part of the enhanced region.

5. The display apparatus according to claim 4, wherein the main color tone determining portion is configured to acquire grayscale values of all sub-pixels of a same color in at least a part of the enhanced region; obtain an average value of the grayscale values of the sub-pixels of a same color in at least a part of the enhanced region, by calculating, so as to obtain average values of the grayscale values of the sub-pixels of different colors; and obtain a color value as the main color tone according to the average values of the grayscale values of the sub-pixels of the different colors.

6. The display apparatus according to claim 1, wherein the display enhanced processing comprises forming an enclosed line at an edge of the enhanced region or forming a highlighted background in the enhanced region.

7. The display apparatus according to claim 6, wherein the display enhanced processing further comprises displaying the enclosed line or the highlighted background in a flashing manner.

8. The display apparatus according to claim 1, wherein the indication signal receiver comprises a plurality of photosensitive units, and the first display portion comprises the plurality of photosensitive units.

9. The display apparatus according to claim 1, wherein the indication point is a point projected on the first display portion by a light sensing indicator.

10. The display apparatus according to claim 1, further comprising a second display portion configured to receive the signal of the second image to form the second image comprising a display enhanced portion.

11. The display apparatus according to claim 10, wherein the second display portion comprises a projection device or a display panel.

12. A display method, comprising:

displaying a first image by a first display portion;

projecting an indication point on the first image, acquiring a position of the indication point in a region where the first image is located;

determining an enhanced region according to the position of the indication point in the region where the first image is located; and performing a display enhanced processing on the enhanced region according to a signal of the first image to form a signal of a second image, outputting the signal of the second image;

wherein the display enhanced processing comprises an adjustment in color of the enhanced region, the adjustment in color of the enhanced region comprises an adjustment in color of a background of the enhanced region.

13. The display method according to claim 12, wherein a region of the first image other than the enhanced region is not enhanced in display.

14. The display method according to claim 12, further comprising receiving the signal of the second image by a second display portion, and displaying the second image comprising a display enhanced portion by the second display portion.

15. A computer program product for image processing, comprising a computer readable storage medium on which computer program instructions are stored, the computer program instruction being executed by a processor to cause the processor to:

receive a position signal of an indication point in a region where a first image is located;

determine an enhanced region according to the position signal; and perform a display enhanced processing on the enhanced region according to a signal of the first image to form a signal of a second image;

wherein the display enhanced processing comprises an adjustment in color of the enhanced region, the adjustment in color of the enhanced region comprises an adjustment in color of a background of the enhanced region.

16. The display method according to claim 12, wherein the display enhanced processing comprises forming an enclosed line at an edge of the enhanced region or forming a highlighted background in the enhanced region, wherein the display enhanced processing further comprises displaying the enclosed line or the highlighted background in a flashing manner.

17. The display apparatus according to claim 1, wherein the enhanced region is a region that expands outward with the indication point as a center point.

18. The display apparatus according to claim 1, wherein the indication point is projected on the first image, and the second image is an enlarged image of the first image.

* * * * *